Feb. 2, 1971     H. M. MASTERS     3,560,949
THRESHOLD CIRCUIT FOR DETECTING AND INDICATING AN OVERVOLTAGE
Filed June 27, 1968
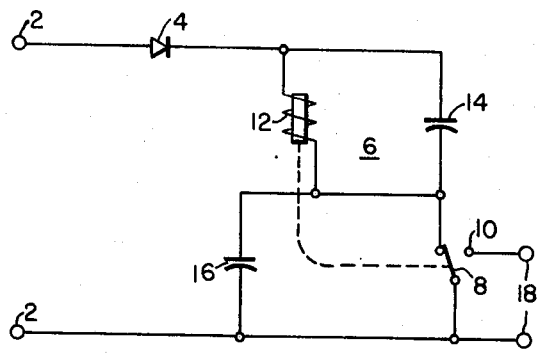
FIG. I.
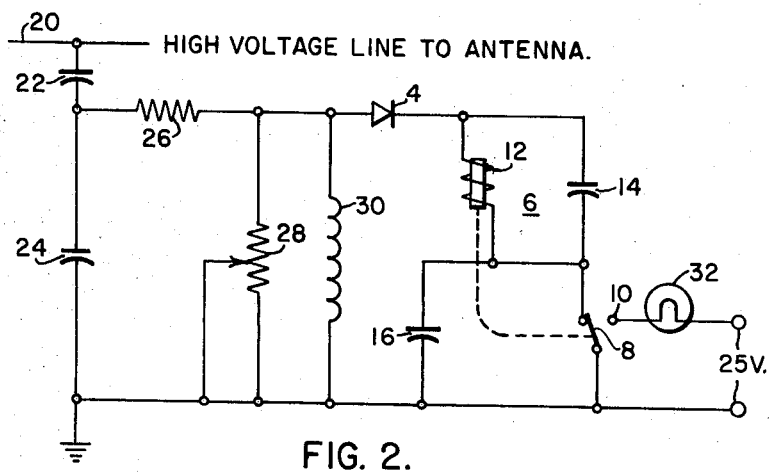
FIG. 2.
WITNESSES:
Leon M. Garman
James F. Young
INVENTOR
Harvey M. Masters
BY Ernest P. Klipfel
ATTORNEY United States Patent Office 3,560,949
Patented Feb. 2, 1971

3,560,949
THRESHOLD CIRCUIT FOR DETECTING AND
INDICATING AN OVERVOLTAGE
Harvey M. Masters, Ellicott City, Md., assignor to Westinghouse Electric Corporation, Pittsburgh, Pa., a corporation of Pennsylvania
Filed June 27, 1968, Ser. No. 740,756
Int. Cl. G08b 21/00
U.S. Cl. 340—248       8 Claims

ABSTRACT OF THE DISCLOSURE

A threshold circuit for detecting and indicating an overvoltage. An example being to sense the voltage at an antenna being fed from a transmitter through an antenna coupler. A switching contact and an operating coil therefore are connected in a series circuit combination with a first capacitor connected across the operating coil. After the first capacitor charges to approximately the peak of the voltage being monitored, current through the operating coil will be sufficient to actuate the switching contact should the sensed voltage exceed the predetermined threshold value. After actuation of the switching contact, the operating coil and first capacitor are disconnected from the voltage to be sensed whereupon the first capacitor discharges through the operating coil to maintain the switching contact in its actuated position until the discharge current is less than the hold-in current requirement of the operating coil. The switching contact will then return to its normal position and as long as the voltage to be sensed remains above the threshold level, the operating coil will be alternately energized and deenergized through the action of the switching contact.

A second capacitor may be advantageously connected across the switching contact to momentarily draw current through the operating coil from the overvoltage source to allow the switching contact to complete its switching cycle without chattering.

BACKGROUND OF THE INVENTION

Field of the invention

The present invention relates generally to overvoltage detection circuits and more particularly relates to a simple low-hysteresis threshold circuit.

The present invention provides an output indication whenever the detected voltage exceeds a predetermined magnitude. The circuit provides a positive output indication when overvoltage occurs. Direct current, alternating current, radio frequency and pulse sources may be detected for overvoltage. Four non-critical components are required for alternating current sources and only two components are required to sense overvoltage on a direct current source.

Description of the prior art

The sensitivity of prior art overvoltage detectors is degraded by hysteresis conditions. Usually the threshold circuit will turn off at a voltage considerably less than the voltage which actuates the circuit. Having sensed an overvoltage condition, the threshold circuit should discontinue its output indication when the overvoltage condition ceases to exist.

One threshold circuit of the prior art utilizes semiconductor devices connected in a conventional Schmitt-trigger configuration with a Zener diode followed by a relay, but its threshold point may vary greatly with changes in ambient temperature unless the transistor stages of the Schmitt trigger contain temperature compensating means.

The present invention provides a simple, low-hysteresis, threshold circuit utilizing electromechanical contact means such as a relay or contactor in a simple, straightforward, easy to service manner.

Accordingly, an object of the present invention is to provide a threshold circuit capable of sensing a voltage at a predetermined threshold level with little hysteresis; that is, its turn off point is practically the same as its turn-on point.

Another object of the present invention is to provide a threshold circuit capable of sensing direct current, alternating current, radio frequency, or pulse levels.

Another object of the present invention is to provide threshold circuit having a minimum of components.

Another object of the persent invention is to provide a threshold circuit employing non-critical components.

Another object of the present invention is to provide a simple low-hysteresis threshold circuit requiring no power supplies for its operation.

Another object of the present invention is to provide a threshold circuit wherein no transistors or vacuum tubes are used.

Another object of the present invention is to provide a threshold circuit capable of essentially constant operation even though the ambient temperature may vary over a wide range.

SUMMARY OF THE INVENTION

A simple, low-hysteresis, threshold circuit utilizing a sensitive direct-current relay or contactor and two capacitors. The operating coil of the relay is connected in series circuit combination with the switching contact across the source of voltage to be detected. A first capacitor is connected across the operating coil to be charged by the voltage to be detected. When overvoltage occurs, sufficient current flows through the operating coil to open the switching contact thereby removing the operating coil and first capacitor from the overvoltage. The first capacitor discharges through the operating coil to maintain the switching contact in its actuated position until the discharge current is less than the hold-in value of the contactor.

A diode is used to rectify alternating current or radio frequency voltages if the voltage to be detected is not direct current. A second capacitor can be advantageously connected across the switching contact. The second capacitor draws operating current through the operating coil momentarily after the switching contact opens thereby allowing the relay or contactor to complete its switching cycle without chattering or becoming locked in an unstable state due to the voltage to be detected being slowly increased towards the threshold level and teasing the circuit operation.

BRIEF DESCRIPTION OF THE DRAWING

Further objects and advantages of the present invention will be readily apparent from the following detailed description taken in conjunction with the drawing, in which:

FIG. 1 is an electrical schematic diagram of an illustrative embodiment of the present invention; and FIG. 2 is a schematic diagram of the illustrative embodiment utilized in radio frequency transmitting equipment.

The threshold circuit is connected to the source to be detected for overvoltage by input terminals 2. The threshold circuit of the present invention can be used to sense direct current, alternating current, radio frequency, or pulse input levels. A diode 4 rectifies alternating current or radio frequency input signals and is not required if the input voltage is direct current. A direct current relay 6 includes a simple single pole, double throw switching contact 8 actuated by an operating coil 12. The operating coil 12, normally closed contact 8 and diode 4 are connected in series circuit combination across the voltage to be sensed. A first capacitor 14 is connected across the operating coil 12. A second capacitor 16 is connected in series circuit combination with the operating coil 12 and across the normally closed switching contact 8. An output circuit 18 is connected to be responsive to the actuate relay 6 by means of the switching contact 10.

It is helpful to understand the operation of the present invention by first considering the second capacitor 16 to be removed from the circuit. Upon connection of the voltage to be sensed, the capacitor 14 will charge to approximately the peak of the input voltage. As the input voltage reaches a predetermined threshold magnitude the current through coil 12 is sufficient to actuate the relay 6.

As soon as the relay is actuated, the coil 12 and capacitor 14 are disconnected from the input voltage. Capacitor 14 begins to discharge through the operating coil 12, producing sufficient current to maintain the operating coil 12 in its energized condition. Capacitor 14 supplies the only current through the operating coil 12 during this time. Since the hold-in current of the relay 6 is much less than the pull-in current, the relay 6 remains energized for some time as capacitor 14 discharges.

When the current supplied by capacitor 14 is reduced below the minimum value required to maintain the relay 6 energized, the contact 8 again closes reopening the output circuit 18. The relay 6 and capacitor 14 are again connected to the input voltage and capacitor 14 will once again charge to the peak value of the input signal.

As long as the input voltage to be sensed remains at or above the threshold level, the relay coil 12 will be alternately energized and deenergized. When the relay 6 is actuated, switching contact 8 connects to the output circuit 18.

Parameters determining the charging time of capacitor 14 are the source resistance magnitude plus the diode forward resistance. The discharging time of capacitor 14 is determined solely by the resistance of the contactor which is usually several thousand ohms for a sensitive current relay. Since the resistances associated with the charging time of the capacitor 14 are small relative to the discharging resistance, the capacitor 14 will charge rapidly and discharge slowly. Thus, the operating coil 12 will remain deenergized only briefly while it can be made to remain energized for a much longer time, depending upon the value of capacitance selected for capacitor 14.

If, when the relay is in its non-actuated position, i.e. the contact 8 is closed, the input voltage to be sensed is decreased only slightly below the threshold value, the contactor will not again energize, for it cannot operate until capacitor 14 is recharged to the threshold voltage.

If any time while contact 8 is open, i.e. the relay is actuated, the voltage to be sensed is decreased below the predetermined magnitude of threshold, the relay 6 will not be actuated again once contact 8 returns to the closed position, since, as before, the current supplied by the source to be sensed will be below the magnitude necessary to pull in the contactor.

Thus, the contactor always deenergizes whenever the voltage to be sensed is reduced below the contactor pull-in value. The voltage does not have to be reduced to the relay drop-out level as would be the case if the relay alone were operated. Therefore, with respect to the sensed voltage, the circuit has virtually no hysteresis.

Occasionally when an alternating current or radio frequency voltage to be sensed slowly increases towards the threshold level, a value is eventually reached which actuates the relay 6 only enough to cause it to open the normally closed contact 8 but fails to fully actuate the relay 6 to close with the terminal 10. Once the contact 8 opened, the contactor 6 immediately deactuated returning the contact 8 to its normally closed position where it once again reopened. Under these conditions the relay 6 will chatter, never being fully actuated to make contact in its second position. Once this condition is established, increasing the voltage to be sensed has no additional effect.

The circuit is locked in an unstable state and the relay 6 continues to chatter, never completely switching. The relay 6 never has an opportunity to draw sufficient current through its operating coil 12 to complete switching before the contact 8 is again opened.

The addition of a second capacitor 16 eliminates this unstable condition and makes the threshold circuit positive acting under all conditions. When the relay 6 is actuated, normally closed contact 8 is opened and capacitor 16 immediately begins to charge. The current through capacitor 16 is supplied entirely from the source being monitored since capacitor 14 can only discharge through the operating coil 12. Thus, the relay 6 continues to draw operating current momentarily after the opening of switching contact 8, allowing the relay to complete its switching cycle.

If the source to be sensed is of direct current, capacitor 16 is not necessary. Only two components, the relay 6, with its operating coil 12 and switching contact 8, and the capacitor 14, are required in applications where the source is direct current.

The normally disconnected terminal 10 provides an output for the threshold circuit. When the contact 8 makes contact with it by actuation of the relay 6, an output signal from 18 indicates the voltage being sensed has reached the threshold level. The relay 6 will then alternately open and close as long as the input level equals or exceeds the predetermined threshold value.

The present invention finds ready use in radio frequency transmitting equipment where a circuit is required to energize a warning light whenever the RF output voltage to an antenna system reaches a critical value. Referring to FIG. 2, similar components have been given identical character references to those of FIG. 1. A high voltage to a much smaller value suitable for operating RF signal from a transmitter to an antenna, provides the source to be sensed. Capacitors 22 and 24 form a voltage divider which reduces the magnitude of the line voltage to a much smaller value suitable for operating the small components of the threshold circuit. A series resistor 26 provides isolation from other circuits connected to the capacitive divider and also forms a resistive divider with a potentimeter 28. The potentiometer 28 is used to calibrate the circuit; that is, to correct for differences in contactor or relay operating currents and to correct for tolerances in the divider or other means used to obtain the signal to be sensed. An inductor 30 provides a low resistance source. The source resistance should be made low relative to the relay resistance in order not to sacrifice rectification efficiency. Such a requirement is standard practice for a half-wave rectifier.

Whenever the voltage to be sensed exceeds a predetermined magnitude or threshold, a lamp 32 alternately flashes on and off as the relay 6 is actuated; that is the operating coil 12 is cycled.

Transmitting equipment successfully utilizing the present invention operated at a high voltage in the frequency range of 17 to 60 kilocycles. Whenever the RF output voltage reached 25 kilovolts, a critical voltage for the antenna system being fed, the threshold circuit provided a visual output by the lamp 32, coming on for approximately two seconds and being off only momentarily. Representative values for the circuitry of FIG. 2 are as follows:

Rectifier 4—Westinghouse Type 1N483B.
Relay (or contractor) 6—DC Sensitive Relay with one single-pole, double-throw contact. Coil DC resistance 14K ohms.
Capacitor 14—60 microfarads.
Capacitor 16—0.1 microfarad.
Capacitor 22—50 micromicrofarads.
Capacitor 24—0.02 microfarad.
Resistor 26—6.8K ohms.
Potentiometer 28—50K ohms.
Inductor 30—150 millihenries.

In brief, the present invention provides an exact threshold point with virtually no hysteresis. It can be used to sense either DC, AC, RF, or pulse input signals. Only four readily available components are required. Only two are required if the input to be sensed is direct current. No component values are critical. No transistors are used. No power supplies are required. The contactor 6 need have only one single-pole, double-throw switching contact. The circuit is essentially insensitive to ambient temperature changes over a wide range.

While the present invention has been described with a degree of particularity for the purposes of illustration, it is to be understood that all modifications, alterations and substitutions within the spirit and scope of the present invention are herein meant to be included.

I claim as my invention:

1. A threshold circuit for detecting overvoltage comprising, in combination; contact means and an operating coil therefor connected in series circuit combination; means for connecting said operating coil to a variable voltage to be detected, said voltage being subject to an overvoltage conditon; means connecting said series combination across the voltage to be detected; capacitive means connected across said operating coil for charging in response to the magnitude of the voltage to be detected when said contact means is in a non-actuated position and discharging through said operating coil when said contact means is in an actuated position; said contact means being actuated when the voltage to be detected reaches a predetermined overvoltage value such that the magnitude of current through said operating coil reaches the pull-in value of the contact means and remaining actuated thereafter until said capacitive means is discharged to that point which results in a coil current less than the hold-in value of the contact means; and output indicator means connected to said contact means when said contact means is in said actuated position for providing a signal indicative of threshold conditions being exceeded.

2. The threshold circuit of claim 1 including second capacitive means connected across said contact means and in series circuit combination with said operating coil for momentarily drawing current through said operating coil upon actuation of said contact means.

3. The threshold circuit of claim 1 wherein the magnitude of said capacitive means is related to the impedance of said operating coil to slowly discharge said capacitive means compared to its charging rate.

4. The threshold circuit of claim 1 wherein the non-actuated position of said contact means is a normally closed position and the actuated position of said contact means is an open condition.

5. The threshold circuit of claim 2 including unilateral conduction means poled to rectify the current through said series circuit combination when said voltage to be detected is alternating current, RF, or pulses.

6. The threshold circuit of claim 3 wherein the discharge of said capacitive means through said operating coil maintains the contact means in its actuated position until the current through said operating coil is less than the hold-in value of said contact means.

7. The threshold circuit of claim 5 including output means responsive to the contact means being in its open position to provide a signal indicative of threshold being exceeded.

8. The threshold circuit of claim 7 wherein said output means provides a signal indicative of threshold being exceeded, which output signal is periodically actuated as the operating coil is alternately energized and deenergized.

References Cited
UNITED STATES PATENTS
| | | | |
|---|---|---|---|
| 2,208,125 | 7/1940 | Feingold | 317—141X |
| 2,895,082 | 7/1959 | Suyetani | 317—151X |

FOREIGN PATENTS
| | | | |
|---|---|---|---|
| 448,549 | 6/1936 | Great Britain | 317—151 |

DONALD J. YUSKO, Primary Examiner

D. MYER, Assistant Examiner

U.S. Cl. X.R.

317—123